No. 876,546. PATENTED JAN. 14, 1908.
L. E. HICKOK.
VEHICLE GEAR.
APPLICATION FILED MAY 24, 1907.
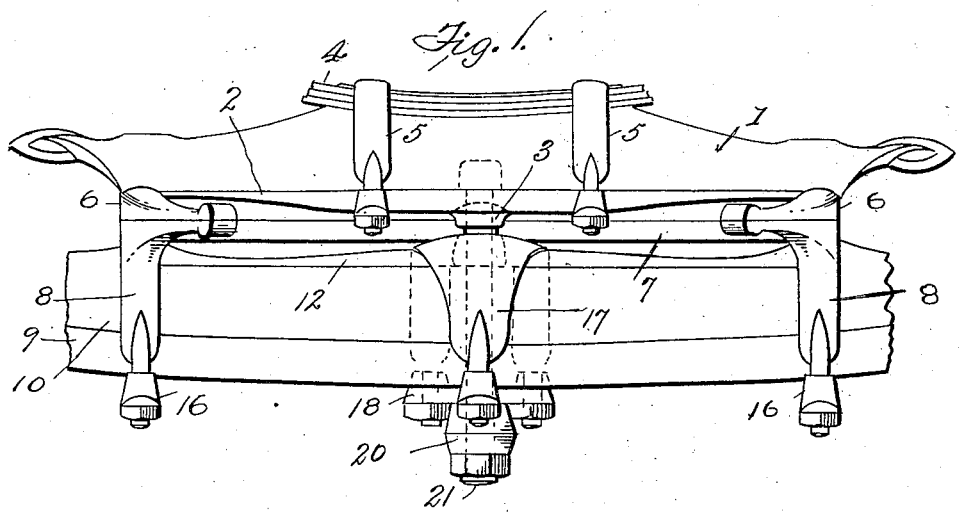
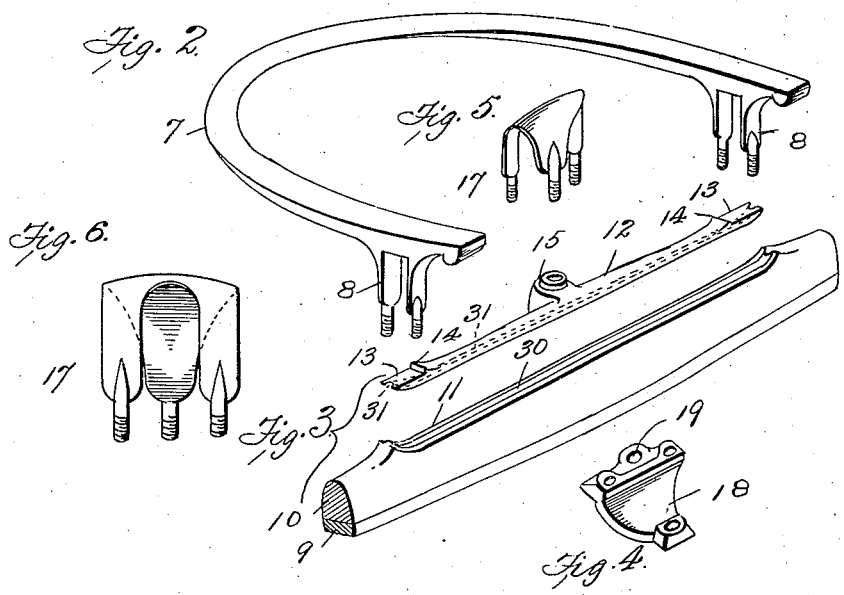
Witnesses
Chas. K. Davies
Ralph Wormelle
Inventor
L. E. Hickok,
By F. E. Stebbins,
Attorney

UNITED STATES PATENT OFFICE.

LESTER E. HICKOK, OF BROOKLYN, NEW YORK, ASSIGNOR OF ONE-HALF TO THE CLEVELAND HARDWARE COMPANY, OF CLEVELAND, OHIO.

VEHICLE-GEAR.

No. 876,546.      Specification of Letters Patent.      Patented Jan. 14, 1908.

Application filed May 24, 1907. Serial No. 375,458.

*To all whom it may concern:*

Be it known that I, LESTER E. HICKOK, a citizen of the United States, residing at Brooklyn, in the county of Kings and State of New York, have invented new and useful Improvements in Vehicle-Gears, of which the following is a specification.

The object of the invention is the provision of a gear which shall be comprised of elements or parts of simple construction, which elements can be cheaply manufactured, easily assembled, and a part easily replaced when necessary, and which gear shall be strong and durable and of symmetrical proportions.

The invention broadly consists in cutting away part of the material at the top of the axle or axle cap at the central portion thereof and filling the space previously occupied by the material removed with a metallic plate which shall restore the axle cap or axle to its original form or shape, said metallic plate to be provided with ends which form seats for the lower fifth wheel member and which interlock therewith.

It further consists in certain novelties of construction and combinations of parts.

The accompanying drawing illustrates an example of the physical embodiment of the invention, but in practice slight modifications may be introduced.

Figure 1 is a front view in elevation of a vehicle gear with my improvements applied. Fig. 2 shows the lower fifth wheel member in perspective. Fig. 3 illustrates the axle and cap and the metallic plate. Fig. 4 is a view of the axle yoke. Figs. 5 and 6 are front and rear views of the three pronged clip.

Referring to the several figures, the numeral 1 designates the head block; 2, the head block plate; 3, a perforated lug at the rear edge of the plate; 4, the lower leaves of a spring; 5, two clips; 6, the upper fifth wheel member; 7, the lower fifth wheel member; 8, the clip bolts at the ends of the member, said bolts being threaded; 9, the axle; 10, the axle cap; 11, a space formed by cutting away part of the material of the cap at the central portion thereof; 30, a longitudinal rib; 12, the metallic plate which fits the space 11 and replaces the material removed; 31, a groove to receive the rib; 13, the ends of the plate which are fashioned at their top surfaces to receive the ends of the fifth wheel member between the clip bolts; 14, flanges which engage the sides of the ends of the lower fifth wheel member so that the ends of the plate interlock with the same; 15, a perforated lug at the rear edge of the metallic plate; 16, yokes which secure the lower fifth wheel member to the axle and cap; 17, a three pronged clip; 18, the clip yoke having holes to receive the threaded ends of the prongs of the clip; 19, a hole in the yoke for the king bolt; 20, the perforated brace head; and 21 is the king bolt which passes through the lug at the rear of the head block plate, the lug at the rear of the metallic plate 12, the hole 19 in the axle yoke and the brace head and is held by a nut.

The method of assembling the several parts is obvious from the drawing, but it should be especially noted that the two rear prongs of the axle clip straddle the lug 15 at the rear of the metallic plate.

From the foregoing description it is clear that the several elements or parts of the gear are of very simple construction and can be cheaply produced, that parts may easily be replaced, that the axle and cap are strengthened at the central portions by the metallic plate, and that the gear as a whole is of symmetrical proportions. It should be understood that when an axle cap is not used and the axle is of relatively large dimensions the space 11 for the reception of the metallic plate will be formed in the top surface of the axle.

What I claim is:

1. The combination in a vehicle gear, of an axle; an axle cap cut away at the top central portion to form a space 11, a metallic plate provided with a perforated lug and seats, located within the said space 11; a lower fifth wheel member having clip bolts and with its ends engaging the seats at the ends of the metallic plate; clip yokes; a three pronged clip straddling the lug of the metallic plate; an axle yoke; a head block plate; and a king bolt.

2. The combination in a vehicle gear, of an axle or cap with a space 11 at its top central portion; a metallic plate located within and fitting the space 11; a clip surrounding the axle or axle and cap and the metallic plate; a yoke for the clip; a lower fifth wheel member with its ends interlocking with the ends of the metallic plate and provided with clip bolts; and yokes for the clip bolts.

3. The combination in a vehicle gear, of an axle or cap with a space 11 at its top central portion; a metallic plate located within and fitting the space 11, said plate having seats and flanges 14, 14, and a hole for a king bolt; a clip surrounding the axle or axle and cap and the metallic plate; a yoke for the clip; a lower fifth wheel member engaging the seats and flanges at the ends of the metallic plate, and having clip bolts; and yokes for the clip bolts.

4. The combination with an axle or axle and cap having a space 11 at the top central portion, of a metallic plate provided with a perforated lug 15, said plate located within and fitting the space 11; a three pronged clip straddling the said lug 15; an axle yoke with a hole 19 for the king bolt, and holes for the prongs of the clip; a lower fifth wheel member engaging the ends of the said metallic plate and provided with clip bolts; and yokes for the clip bolts.

5. The combination with an axle, of a cap cut away at the top portion to form a space 11; a metallic plate seated within said space 11; a clip and yoke passed around the axle, cap and plate at the center; a lower fifth wheel member with clip bolts, the ends of the said member engaging the ends of the metallic plate; and yokes for the clip bolts; whereby the axle and cap are strengehtned at the central portions thereof.

In testimony whereof I affix my signature in presence of two witnesses.

LESTER E. HICKOK.

Witnesses:
RALPH WORMELLE,
F. E. STEBBINS.